United States Patent
Brunn et al.

(10) Patent No.: US 10,015,128 B2
(45) Date of Patent: *Jul. 3, 2018

(54) SOCIAL CONTENT FEATURES BASED ON USER TRACKING

(71) Applicant: International Business Machines Corporation, Armonk, NY (US)

(72) Inventors: Jonathan F. Brunn, Logan, UT (US); Jeffrey R. Hoy, Gibsonia, PA (US); Marit L. Imsdahl, Cary, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,469

(22) Filed: May 16, 2016

(65) Prior Publication Data
US 2016/0315899 A1  Oct. 27, 2016

Related U.S. Application Data (63) Continuation of application No. 14/695,515, filed on Apr. 24, 2015.

(51) Int. Cl.
*H04L 12/58* (2006.01)
*H04L 29/08* (2006.01)
*G06F 17/30* (2006.01)

(52) U.S. Cl.
CPC .......... *H04L 51/26* (2013.01); *G06F 17/3053* (2013.01); *G06F 17/30321* (2013.01);
(Continued)

(58) Field of Classification Search
CPC .......... G06F 17/30017; G06F 17/3002; G06F 17/30029; G06F 17/30038;
(Continued)

(56) References Cited

U.S. PATENT DOCUMENTS 7,730,054 B1 * 6/2010 Marmaros ......... G06F 17/30867
                                                    707/713
7,769,740 B2   8/2010 Martinez et al.
(Continued)

FOREIGN PATENT DOCUMENTS

WO   2014105345 A1   7/2014

OTHER PUBLICATIONS

Xu, S. et al., "A user-oriented webpage ranking algorithm based on user attention time", Proceedings of the Conference on Artificial Intelligence, Jul. 2008, pp. 1255-1260, vol. 2.
(Continued)

*Primary Examiner* — Cam-Y Truong
(74) *Attorney, Agent, or Firm* — Scully, Scott, Murphy & Presser, P.C.

(57) ABSTRACT

Prioritizing online comments on social network web page is disclosed. An activity of a user consuming a content presented on the social network web page is detected. Time spent by the user consuming the content is determined. Responsive to the user entering a comment on the content, a depth of consumption of the content by the user is determined based on the time spent by the user consuming the content. The comment entered by the user is ranked among a plurality of comments entered by one or more of the plurality of users based on the depth of consumption. The comment entered by the user is presented on the social network web page in the order of the ranking.

9 Claims, 3 Drawing Sheets

(52) U.S. Cl.
CPC .. *G06F 17/30554* (2013.01); *G06F 17/30867* (2013.01); *H04L 51/32* (2013.01); *H04L 67/02* (2013.01); *H04L 67/22* (2013.01)

(58) Field of Classification Search
CPC ......... G06F 17/30551; G06F 17/30321; G06F 17/30867; G06F 17/30554; G06F 17/3053
See application file for complete search history.

(56) References Cited

U.S. PATENT DOCUMENTS

| | | |
|---|---|---|
| 8,572,094 B2 | 10/2013 | Luo et al. |
| 9,401,947 B1* | 7/2016 | Oztaskent ........... G06F 17/3053 |
| 9,659,065 B1* | 5/2017 | Reis de Sousa .... G06F 17/3053 |
| 2006/0031043 A1* | 2/2006 | Oral ................... G06F 17/30722 |
| | | 702/187 |
| 2006/0041562 A1* | 2/2006 | Paczkowski ...... G06F 17/30884 |
| 2008/0189169 A1* | 8/2008 | Turpin ................... G06Q 30/02 |
| | | 705/7.33 |
| 2008/0319827 A1 | 12/2008 | Yee et al. |
| 2011/0040787 A1* | 2/2011 | Cierniak ........... G06F 17/30864 |
| | | 707/770 |
| 2011/0087955 A1* | 4/2011 | Ho ........................ G06F 17/211 |
| | | 715/230 |
| 2011/0276628 A1 | 11/2011 | Pell |
| 2012/0005224 A1* | 1/2012 | Ahrens .................. G06Q 10/10 |
| | | 707/769 |
| 2012/0259866 A1 | 10/2012 | Austin et al. |
| 2013/0080264 A1* | 3/2013 | Umeda .................. G06Q 30/02 |
| | | 705/14.69 |
| 2013/0091419 A1* | 4/2013 | Caliman ............... G06F 17/241 |
| | | 715/236 |
| 2013/0151300 A1 | 6/2013 | Le Chevalier et al. |
| 2013/0332386 A1 | 12/2013 | Billmaier et al. |
| 2014/0019209 A1 | 1/2014 | Cole |
| 2014/0278986 A1 | 9/2014 | Rouse et al. |
| 2014/0280133 A1* | 9/2014 | Dulitz ................ G06Q 30/0201 |
| | | 707/736 |
| 2015/0120712 A1* | 4/2015 | Yi ..................... G06F 17/30053 |
| | | 707/723 |

OTHER PUBLICATIONS

Acar, G. et al., "The Web Never Forgets: Persistent Tracking Mechanisms in the Wild", CCS '14 Proceedings of the 2014 ACM SIGSAC Conference on Computer and Communications Security, Nov. 2014, pp. 674-689.

List of IBM Patents or Patent Applications Treated as Related dated May 16, 2016, 2 pages.

Office Action dated Jul. 27, 2017 received in parent U.S. Appl. No. 14/695,515, 40 pages.

\* cited by examiner

SOCIAL CONTENT FEATURES BASED ON USER TRACKING

FIELD

The present application relates generally to computers and computer applications, and more particularly to social networking and computer-implemented application that identifies and prioritizes user comments on online social network.

BACKGROUND

Social networking applications allow users to post content on their social network application page and also to view and comment on the content posted by other users of the social network application. It has been found that not all users actually read or view the online content about which the users are making comments. For example, users may indicate their likes or post commentaries on a content shown on their social network pages without having read the content. In this context, not everyone's voice is equal. That is, people may spend a lot of time reading and considering materials, only to have their voice drowned out by the opinions of consumers who have not really considered a topic. Equally, the readers and consumers of the comments, shares, likes, are themselves at a disadvantage, not receiving the most thoughtful or relevant information.

BRIEF SUMMARY

A method of prioritizing online comments on social network web page, in one aspect, may comprise detecting an activity of a user consuming a content presented on the social network web page. The method may also comprise determining time spent by the user consuming the content. The method may further comprise storing the determined time spent by the user consuming the content in a data structure associated with the user, wherein the detecting an activity of the user, the determining of the time spent by the user, and the storing are performed for each of a plurality of users. The method may also comprise indexing the plurality of users' time spent consuming the content. The method may further comprise, responsive to the user entering a comment on the content, determining a depth of consumption of the content by the user based on the determined time spent by the user consuming the content. The method may also comprise ranking the comment entered by the user among a plurality of comments entered by one or more of the plurality of users based on the depth of consumption. The method may further comprise presenting the comment entered by the user on the social network web page in the order of the ranking.

A system for prioritizing online comments on social network web page, in one aspect, may comprise a processor and a memory coupled to the processor. A user interface associated with a social network application running on the processor presents a content; and an application running on the processor detects an activity of a user consuming the content presented on the user interface. The application is further operable to determine time spent by the user consuming the content and to store the determined time spent by the user consuming the content in the memory in a data structure associated with the user. The application detects an activity of the user, determines the time spent by the user, and stores the determined time spent for each of a plurality of users. The application is further operable to index the plurality of users' time spent consuming the content. Responsive to the user entering a comment on the content, the application is further operable to determine a depth of consumption of the content by the user based on the determined time spent by the user consuming the content. The application is further operable to rank the comment entered by the user among a plurality of comments entered by one or more of the plurality of users based on the depth of consumption. The application is further operable to present the comment entered by the user on the user interface in the order of the ranking.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A method, system and/or techniques are provided that prioritize or rate user's online comments based on the user attention paid to the online content or material relevant to the comments. In one embodiment, users viewing of content may be tracked to form a viewing time by entries (e.g., elements, sections) in the content for individual users and comments from the users related to the content are prioritized based on a user attention (e.g., time spent) on the entries related to the comments. In one aspect, the user attention is derived from data points considering display of the entries of the content and other displayed content. The comments may include "liking", "disliking", "sharing", "posting" and/or others. "Liking" of content on a social network user interface page, for example, indicates the user's approval of the content. "Disliking" of content on a social network user interface page, for example, indicates the user's disapproval of the content. "Posting", for example, allows inputting a descriptive commentary on the content via the social network user interface page. Such comments may be entered on a user interface page of the social network application, e.g., the user's social network web page, by clicking on one or more user interface elements such as buttons, inputting text or pictures, or another media. The content may include text, video, audio, images, and/or others. In one aspect, the attention is prorated based on user specific behavior. The prioritized or rated comments may be displayed ordered by the priority. The entries related to the comments may be determined by an algorithm that factors counts of references, attributions, subject relevance and combination of words.

The method, system and/or techniques of the present disclosure in one embodiment prioritize and display comments and/or shares of user who have more thoroughly considered the material being shared. In one embodiment, the method and/or system may track the length of time a user has spent reading, e.g., an area of content (e.g., an online article) a user has read or area of a video the user has viewed may be tracked noting the amount of time or effort the user puts into the reading or viewing. In one aspect, responsive to the user (e.g., a reader) taking an action on the content (e.g., liking, sharing, messaging, commenting), the method and/or system may use the information about the user's reading of the article to improve the rendering of feeds for people following the commentator (the user) in a number of ways by computing a relevancy score for the user's action.

The method and/or system of the present disclosure in one embodiment may include utilizing user tracking to determine how long a user spends reading content, and using this information to promote actions of a user who has absorbed the material to their followers. In this way, a consumer of a news feed sees the most thoughtful and considered comments and actions from the consumer's network. User's comments and actions for display to the user's network are weighted based on how long the user spent reading the content. In one aspect, emphasis is given to those users that spend more time reading the content. By utilizing social content features based on user tracking, better feedback and recommendations into the social network may be obtained.

In one aspect, the method and/or system of the present disclosure may use existing technology such as embedded browser controls and mobile apps (applications) to gather how long a user spends reading a particular content, e.g., online newspaper article, short story, post, or another online content. This knowledge is input into a social network for intelligent suggestions for future readings. Responsive to a user commenting on content the user has read or, in the case of a video, viewed, the method and/or system can treat the user's comment differently than a comment from someone who has not read the content.

In one embodiment, actions from users who have actually read the article (e.g., as measured by a progression at least of a certain speed through the article, where the threshold speed may vary by reader based on their history) or viewed a video (as measured by the video playing through to completion) are given a higher score. If the user has quoted a specific area of the article, the method and/or system of the present disclosure in one embodiment confirm that the user has read that area of the article or watched that part of a video in context (e.g., as opposed to viewing a clip selected by another user or copying a quote from another user). If the user has not read or viewed the area being quoted, the score for the user is lowered.

Figure 1:
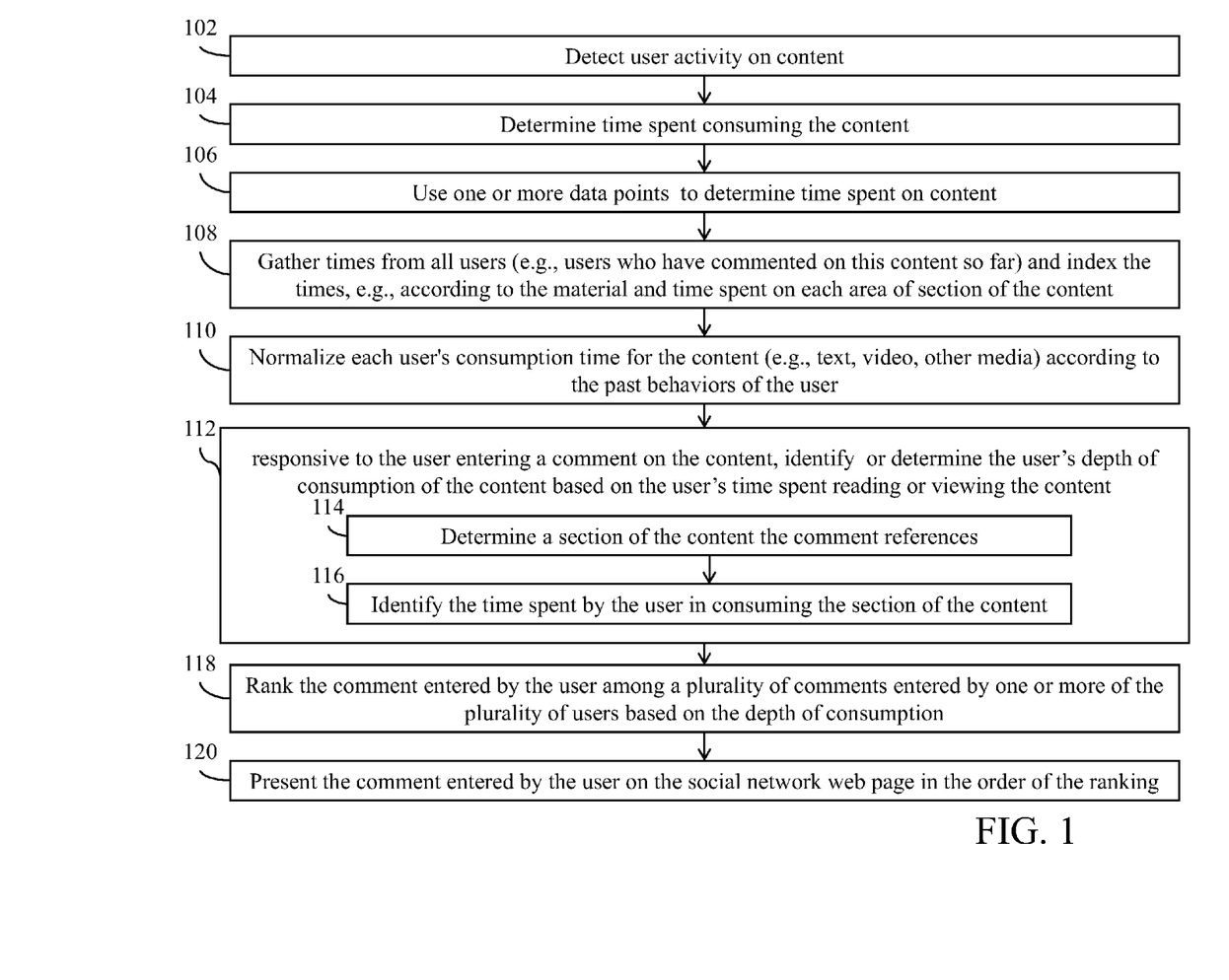
FIG. 1 is a flow diagram illustrating a method of detecting a degree of user attention paid to social content and prioritizing social content features in one embodiment of the present disclosure.

FIG. 1 is a flow diagram illustrating a method of detecting a degree of user attention paid to social content and prioritizing social content features in one embodiment of the present disclosure. For instance, the method may prioritize comments based on user attention to material relevant to the comments, for example, on social network web page. At 102, a user activity on content (online content) is detected. For example, a user's consuming of content via a user interface of a social network (or the like), for instance, reading content, viewing video, listening to audio, or performing another activity on a user's social network page, is detected.

At 104, time spent reading or otherwise consuming this content, e.g., which sections have been on the screen for certain time, which sections of video or audio have been consumed, is determined and saved for the user. Various existing techniques may be used for capturing this information. An example includes explicit third-party information sharing, which may include various forms of front-end cross domain information sharing or backend database merges. Other examples may include an application or browser provided by a social network application, such as embedded controls in a social network application, plugins in the browser, and a mobile application using an embedded browser to display content which is linked to from inside the application. Even when those options are not available, the system and/or method of the present disclosure may track when the user has at least clicked on the content, and use that information to promote the user's actions and comments on that content. The system and/or method of the present disclosure may also make use of embedded audio and video controls and content readers to keep the user's actions in view of the social network where possible. In one aspect, based on the tracked information associated with the user's viewing of the content, a viewing time data for each user may be generated and stored. For instance, the viewing time data may be organized or structured according to a viewing time data structure that includes viewing time entries by element or section of the content for each user. The viewing time data may be stored in the viewing time data structure.

At 106, one or more data points are used to determine time spent on an article. A data point for example may include a point in data operation such as when a browser window for the content was opened/closed (e.g., in the case that more specific tracking is not available) or how long it takes for the user to return to the social network after clicking an external. For instance, when a user content view is not in direct view of the system, such as when a user opens a link from the user's social network application in an operating system and browser that does not integrate or does not have a plugin for the social network, and where the target of the link directs to a web site or another online location, which does not share information with any third parties, the system and/or method of the present disclosure in one embodiment may estimate the time spent in the other web page (or another online page) based on the user's return time back to the user's social network page. In one aspect, if there is absolutely zero return time, it may be assumed the user has opened the material for later consumption and such zero return time in one embodiment is not be counted against the user, e.g., it is counted differently from 0 reading time.

At 108, times from all users (e.g., users who have commented on this content so far) are gathered and indexed according to the material and time spent on each area of section of the content. For instance, the processing at 104 and 106 may be performed for each of a plurality of users that are consuming the content on their respective social network web pages.

At 110, each user's consumption time for the content (e.g., text, video, other media) is normalized according to past behaviors of the user, e.g., to ensure that faster readers or viewers are not penalized.

At 112, responsive to the user entering a comment on the content, the user's depth of consumption of the content may be identified based on the user's time spent reading or viewing the content, for example, determined at 104.

In one aspect, for example, as shown at 114, responsive to the user commenting on the content, the user's comment is scanned for references to the content, e.g., if the content included an article, for references to the article. For example, the section of the content the comment addresses or references may be determined. Such references in the user's content may be explicit, direct references such as quotes, and/or uncommon combinations of words which appear disproportionately in the user's comment compared to the normal vocabulary of the user, and which also appear in certain section of the content text disproportionately to the rest of the content text, where content text may be an automated transcription from audio or video. For instance, if the user's comment contains the words "XYZ", and the article contains "XYZ" in numerous places throughout the article, then the attribution to a specific area of the article is not determined. However, if the article only mentions "XYZ" in one paragraph or one section of video, and the text does not appear in summary information about the article such as a description or tags (e.g., descriptive tags associated with the article or content, metadata associated with the article or content), then the user's comment is taken to be related to a specific area of the content.

At 116, the referenced section is compared to the indexed consumption recorded for the user, e.g., to determine whether or not the user has consumed the content and/or the depth or degree of the user's consumption. If the user has not clicked on the link through the social network application or page, but is taking a reshare action with a comment from another user's share, then the system of the present disclosure in one embodiment concludes the user is commenting without reading. If the user has clicked on the link, the system of the present disclosure further determines the depth of the user's consumption, and whether the user has consumed the area being discussed. The depth or degree of the user's consumption is determined to be proportional to the amount of time spent by the user reading or viewing the content or the area of the content.

At 118, comments and/or other actions (e.g., reshares) are prioritized for delivery to followers based on whether the user (actor) actually consumed the content being acted on, the depth to which they consumed it, and the depth relative to their normal level of contribution. For instance, the user's comment is ranked among a plurality of comments entered by one or more other users based on the depth of the user's consumption. The user's normal level of contribution may be determined as an average or mean level of the user's contribution history on the user's social's network.

In one aspect, there may be cases where the system's determination may be inconclusive. For example, a user's action may direct viewing of content that is outside the view of the social network application. In one embodiment, the system and/or method of the present disclosure may treat such cases as if the user has consumed the content. In another embodiment, the system and/or method of the present disclosure may be configured to give preference to the users whose viewing behavior is known to the social network.

At 120, the comment entered by the user is presented on the social network web page in the order of the ranking. For example, comments from users with a greater "reading time" are prioritized during display. For instance, comments on content item on a social network page may be displayed in the order of prioritization, for example, the user's comments may be displayed in a ranked order among other users' comments, for example, with the comment determined to have the greatest "reading time" displayed or presented at the top of the list.

Figure 2:
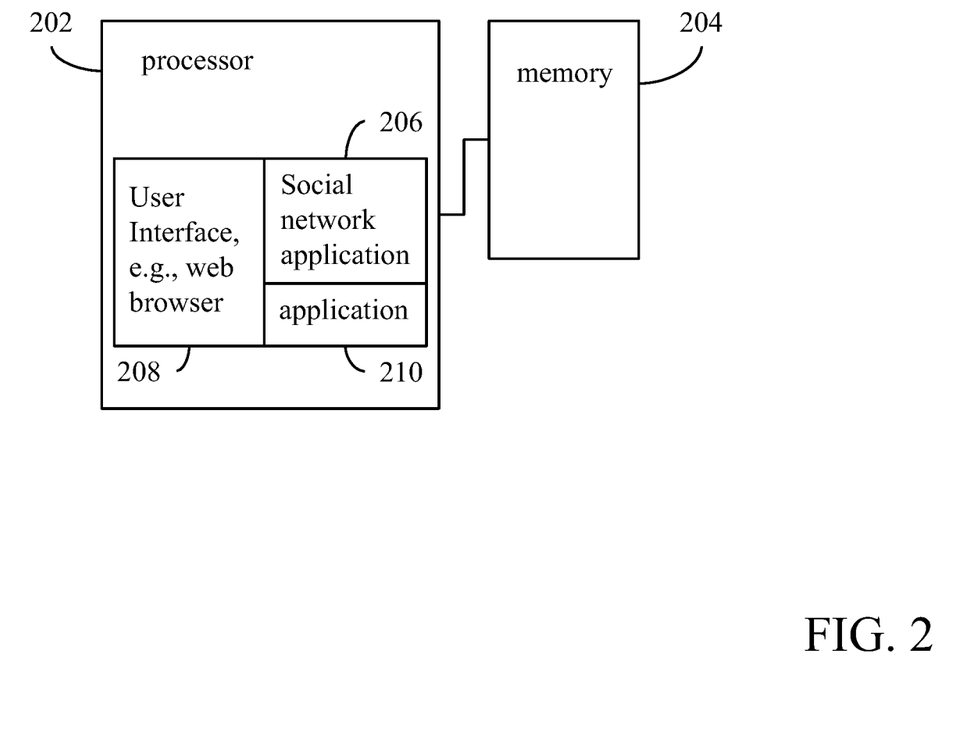
FIG. 2 is a diagram illustrating components of a system of the present disclosure in one embodiment for prioritizing online comments on social network web page.

FIG. 2 is a diagram illustrating components of a system of the present disclosure in one embodiment for prioritizing online comments on social network web page. A processor 202 may include a central processing unit (CPU) or another hardware processor. A memory 204 is coupled to the processor. A user may interact with a social network application 206 via a user interface 208 associated with a social network application, for example, a browser such as a web browser. Social network content may be presented on the user interface 208. An application 210 running on the processor detect an activity of a user consuming the content presented on the user interface. The application 210 may be part of the social network application 206 or a plugin to the browser or user interface 208, or another tool, e.g., integrated with the social network application 206. The application 210 may determine time spent by the user consuming the content and store the determined time spent by the user consuming the content in the memory 204, e.g., in a data structure associated with the user. The application 210 may detect an activity of the user, determine the time spent by the user, and store the determined time spent for each of a plurality of users, who for example views the content and comments on the comment.

The application 210 may index the plurality of users' time spent consuming the content. Responsive to the user entering a comment on the content, the application 210 may determine the depth of consumption of the content by the user based on the determined time spent by the user consuming the content. The application 210 may also rank the comment entered by the user among a plurality of comments entered by one or more of the plurality of users based on the depth of consumption. The application may further present the comment entered by the user on the user interface 208 in the order of the ranking.

An embodiment of the system and/or method of the present disclosure as described above uses a user's prior time spent on content to predict future interest in content and change notification or delivery of news, or use this information to gauge the value of a user's contributions with respect to content they have spent time on. The promotion of a first user's posts to other second users may be changed based on the first user's time or depth of consumption of the content. In one aspect, prioritization of social network notifications for other users may be based on the "amount of time spent on content".

Figure 3:
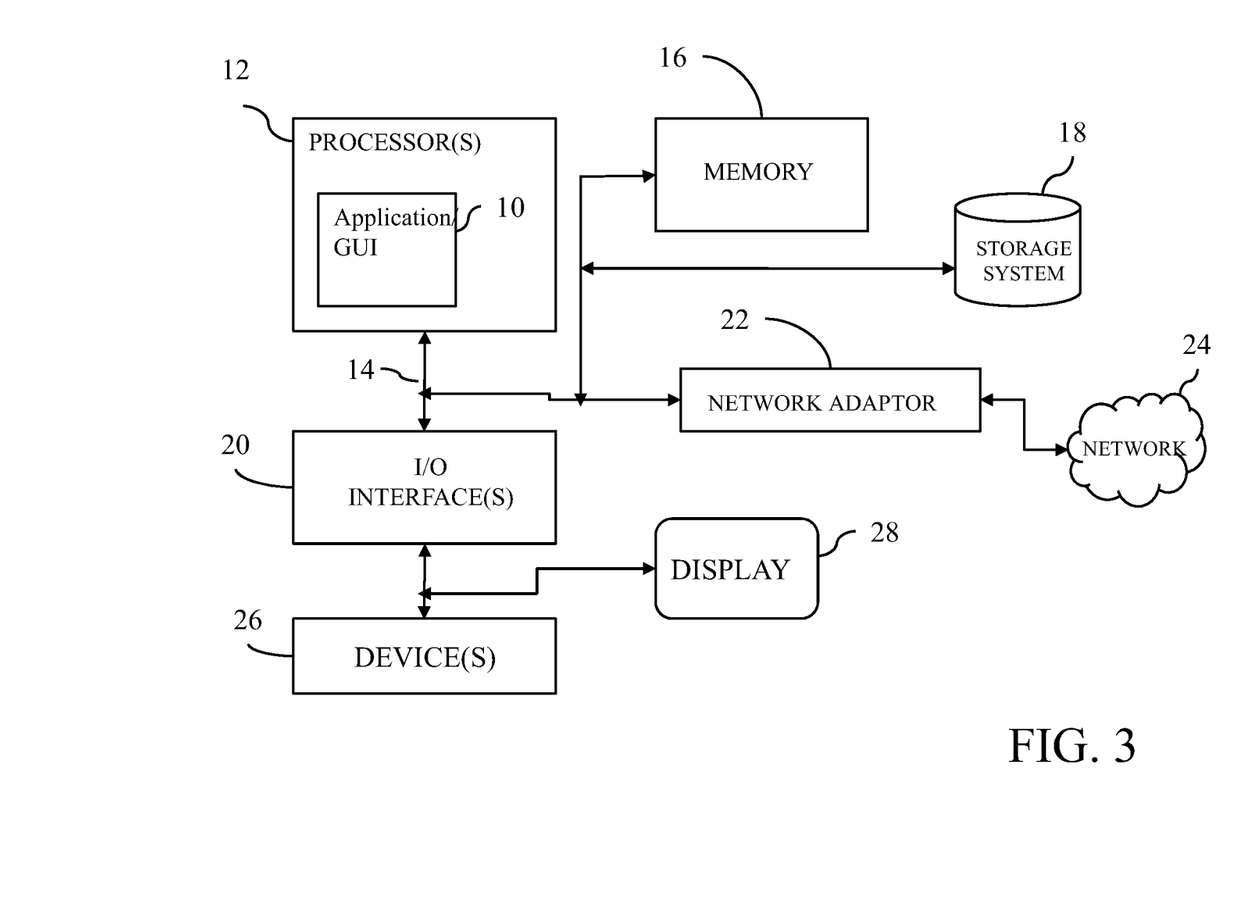
FIG. 3 illustrates a schematic of an example computer or processing system that may implement a comment prioritization system in one embodiment of the present disclosure.

FIG. 3 illustrates a schematic of an example computer or processing system that may implement a comment prioritization system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method, in a social network system including a processor and a memory, the memory comprising instructions executable by the processor to run a tracking application that is integrated with a social network application, for prioritizing online comments on a social network web page presented on a graphical user interface associated with the social network application, the method comprising:

detecting, by the tracking application running on the processor of the social network system, an activity of each user of a plurality of users consuming a content presented on the social network web page, wherein the content is presented by the graphical user interface associated with the social network application:

determining based on the detected activity, by the tracking application running on the processor of the social network system, time spent by said each user of the plurality of users consuming the content on the social network web page, wherein the determining time spent by the user consuming the content, comprises: for content that is consumed by the user is not integrated with the social network web page, determining a difference in time between the user linking to the content from the social network web page and the user returning to the social network web page;

storing, by the tracking application running on the processor of the social network system, the determined times spent by the plurality of users consuming the content in a data structure of the memory, to normalize the time spent by said each user of the plurality of users based on past viewing behaviors of the user on the content, indexing, by the tracking application running on the processor of the social network system, the determined times spent by the plurality of users consuming the content;

responsive to the user entering a comment on the content via a network, determining, by the tracking application running on the processor of the social network system, a depth of consumption of the content by the user based on the determined time spent by the user consuming the content, wherein the determining the depth of consumption of the content comprises: identifying the time spent by the user in consuming a section of the content, wherein the identifying the time spent by the user in consuming the section of the content comprises comparing a determined section of the content with viewing time spent entries by the sections that are indexed;

changing, by the tracking application running on the processor of the social network system, a promotion of posts generated by the user to other users of the social network web page based on the determined depth of consumption;

ranking, by the tracking application running on the processor of the social network system, the comment entered by the user among a plurality of comments entered by one or more of the plurality of users based on the depth of consumption; and presenting, by the tracking application running on the processor of the social network system, the comment entered by the user and the plurality of comments entered by the plurality of users, on the social network web page of the graphical user interface of a user computer in the order of the ranking to prioritize comments entered by users who spent more time to consume on the content by comparing times spent of the users who spent more time with times spent by the rest of the users that consumed the content, wherein feedback on the content is rendered on the social media web page according to the prioritized comments.

2. The method of claim 1, wherein the time spent by the user consuming the content is stored in a data structure comprising viewing time entries by sections of the content.

3. The method of claim 2, wherein the determining the depth of consumption of the content comprises: determining a section of the content for the comment references.

4. The method of claim 3, wherein the determining a section of the content for the comment references comprises determining whether the comment includes a quote from the section of the content.

5. The method of claim 3, wherein the determining a section of the content for the comment references comprises matching words and phrases occurring in the comment and the content, the words and phrases not appearing in one or more descriptive tags associated with the content.

6. The method of claim 1, wherein the comment comprises one or more of liking, disliking, sharing, messaging, posting, and re-posting.

7. The method of claim 1, wherein the content comprise one or more of text, video, audio, a file, a picture, and an image.

8. The method of claim 1, further comprising normalizing each determined time spent by the plurality of users based on past viewing behaviors of the plurality of users.

9. A method, in a social network system including at least a processor and a memory, for presenting prioritized comments to a social network content associated with a social network application, the method comprising:

detecting, by an application module programmed into integrated circuits of the processor, an activity on a social network page of each commentator of plurality of commentators, wherein the activity includes the commentator consuming the content presented on a graphical user interface of a user computer associate with the social network application;

determining, by the application module, a time spent by said each commentator of the plurality of commentators consuming the content based on the detected activity and one or more data points in data operation associated with display of the content, wherein the determining time spent by the commentator consuming the content, comprises: for content that is consumed by the commentator is not integrated with a social network web page, determining a difference in time between the commentator linking to the content from the social network web page and the commentator returning to the social network web page;

storing, by the application module, the determined times spent by the plurality of commentators consuming the content in a data structure of the memory to normalize the time spent by said each commentator of the plurality of commentators based on past viewing behaviors of the commentator on the content;

indexing, by the application module, the plurality of times spent by the plurality of commentators consuming content in the data structure;

in response to the commentator entering a comment on the content via network, determining, by the application module, a depth of consumption of the commentator during the consumption of the content based on a section of the content referenced by the comment entered by the commentator, and based on an amount of time spent by the commentator consuming the referenced section of the content, wherein the determining the depth of consumption of the content comprises: identifying the time spent by the commentator in consuming a section of the content, wherein the identifying the time spent by the commentator in consuming the section of the content comprises comparing determined section of the content with viewing time spent entries by the sections that are indexed;

changing, by the application module, a promotion of posts generated by the commentators to other users of the social network web page based on the determined depth of consumption;

ranking, by the application module, the comment entered by the commentator among a plurality of comments entered by the plurality of users based on the depth of consumption;

presenting, by the application module, the ranked comments on the user graphical interface of the user computer associated with the social network application in a decreasing order of the depth of consumption, such that comments entered by users who spent more time consuming the content are presented prior to comments entered by users who spent less time consuming the content.

* * * * *